US008860704B2

(12) United States Patent
Lee

(10) Patent No.: US 8,860,704 B2
(45) Date of Patent: Oct. 14, 2014

(54) POWER DRIVER, SOURCE DRIVER, AND DISPLAY APPARATUS INCLUDING THE DRIVERS

(75) Inventor: Wook Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 375 days.

(21) Appl. No.: 12/842,902

(22) Filed: Jul. 23, 2010

(65) Prior Publication Data

US 2011/0141089 A1 Jun. 16, 2011

(30) Foreign Application Priority Data

Dec. 10, 2009 (KR) ........................ 10-2009-0122529

(51) Int. Cl.

*G06F 3/038* (2013.01)
*G09G 3/20* (2006.01)
*G09G 3/32* (2006.01)

(52) U.S. Cl.

CPC ............ *G09G 3/20* (2013.01); *G09G 2330/028* (2013.01); *G09G 2320/0626* (2013.01); *G09G 2330/02* (2013.01); *G09G 3/3225* (2013.01); *G09G 2330/022* (2013.01)

USPC ........................................... 345/211; 345/212

(58) Field of Classification Search

USPC .................................... 345/87-103, 211-215
See application file for complete search history.

(56) References Cited

U.S. PATENT DOCUMENTS

| | | | | |
|---|---|---|---|---|
| 7,095,991 | B2 | 8/2006 | Tsuchi et al. | |
| 2002/0196243 | A1* | 12/2002 | Morita | 345/204 |
| 2003/0095118 | A1* | 5/2003 | Kato | 345/213 |
| 2005/0052170 | A1* | 3/2005 | Kim et al. | 323/282 |
| 2005/0156854 | A1* | 7/2005 | Park et al. | 345/100 |
| 2005/0243588 | A1* | 11/2005 | Kubota et al. | 365/63 |
| 2007/0171218 | A1* | 7/2007 | Hong et al. | 345/211 |
| 2008/0111811 | A1* | 5/2008 | Park | 345/212 |
| 2009/0109147 | A1 | 4/2009 | Park et al. | |

FOREIGN PATENT DOCUMENTS

| | | |
|---|---|---|
| KP | 1020040070971 A | 8/2004 |
| KP | 1020060090467 A | 8/2006 |
| KR | 10-0894606 | 4/2009 |

OTHER PUBLICATIONS

The pdf file of the application note is attached with the filename "TI_appnote.pdf". The date of this publication is May 1997.*
KIPO Office action dated Jun. 20, 2011 in the priority Korean patent application No. 10-2009-0122529, pp. 1-4.

* cited by examiner

*Primary Examiner* — Alexander S Beck
*Assistant Examiner* — Charles Zheng
(74) *Attorney, Agent, or Firm* — Christie, Parker & Hale, LLP

(57) ABSTRACT

A power driver, a source driver, and a display apparatus including the drivers, may reduce standby mode power consumption. The power driver includes a plurality of boosters and a plurality of amplifiers. The power driver is configured to apply a voltage for driving a display apparatus. The power driver is configured to turn off all the plurality of amplifiers when the display apparatus is in a standby mode.

14 Claims, 4 Drawing Sheets

POWER DRIVER, SOURCE DRIVER, AND DISPLAY APPARATUS INCLUDING THE DRIVERS

CROSS-REFERENCE TO RELATED PATENT APPLICATION

This application claims priority to and the benefit of Korean Patent Application No. 10-2009-0122529, filed on Dec. 10, 2009, in the Korean Intellectual Property Office, the entire content of which is incorporated herein by reference.

BACKGROUND

1. Field

Embodiments of present invention relate to a power driver, a source driver, and a display apparatus including the drivers.

2. Description of Related Art

A display apparatus used for a mobile apparatus, such as a portable phone, may include an operating mode in which an image is displayed and an off mode in which no image is displayed. Also, the operating mode may include a normal display mode in which an image is displayed on the entire display screen and a standby display mode in which an image is displayed only on a portion of the display screen.

FIG. 1 is a diagram of a portable phone 200 having a display screen 210 installed on an outward facing side on which a clock is displayed. For example, in a standby mode, when the clock is displayed on the display screen 210 as shown in FIG. 1, an image may be displayed only on a portion of the display corresponding to a number portion 220, while the remaining portion of the display may not display an image. However, even in the standby mode, a power driver and a source driver configured to drive a display apparatus may operate in the same manner as in a normal display mode.

SUMMARY

Embodiments of the present invention provide a power driver, a source driver, and a display apparatus including the drivers, which may reduce power consumption in a standby mode.

According to an aspect of embodiments according to the present invention, there is provided a power driver including a plurality of boosters and a plurality of amplifiers. The power driver is configured to apply a voltage for driving a display apparatus. The power driver is configured to turn off the plurality of amplifiers when the display apparatus is in a standby mode.

The plurality of boosters may include a first booster, a second booster, and a third booster. The plurality of amplifiers may include: a first amplifier, a second amplifier, and a third amplifier coupled to output terminals of the first through third boosters, respectively; and a plurality of gamma amplifiers.

The power driver may be configured to supply an output voltage of the first booster as a gamma voltage corresponding to a smallest gray level data.

The power driver may be configured to supply an input voltage as a gamma voltage corresponding to a largest gray level data.

The power driver may be configured to supply output voltages of the second and third boosters directly to a display panel.

According to another aspect of embodiments according to the present invention, there is provided a power driver including: a first booster configured to receive an input voltage and to generate a first voltage; a first amplifier configured to generate a reference voltage using the first voltage; a second booster configured to receive the input voltage and the first voltage and to generate a second voltage; a second amplifier configured to generate a first panel voltage using the second voltage; a third booster configured to receive the input voltage and the second voltage and to generate a third voltage; a third amplifier configured to generate a second panel voltage using the third voltage; a resistor ladder (or resistance string) having a first terminal coupled to the reference voltage and a second terminal coupled to a ground voltage and configured to divide a voltage between the first and second terminals (or two terminals); and a first gamma amplifier and a second gamma amplifier coupled to the resistor ladder and configured to generate gamma voltages. The first through third amplifiers and the first and second gamma amplifiers are configured to be turned off in a standby mode.

The power driver may be configured to supply the first voltage as a gamma voltage corresponding to a smallest gray level data and the input voltage as a gamma voltage corresponding to a largest gray level data in the standby mode.

The power driver may be configured to supply the second voltage as the first panel voltage and the third voltage as the second panel voltage in the standby mode.

The power driver may further include: a first interconnection configured to apply the first voltage to an output terminal of the first gamma amplifier; a second interconnection configured to apply the second voltage to an output terminal of the second amplifier; a third interconnection configured to apply the third voltage to an output terminal of the third amplifier; and a fourth interconnection configured to apply the input voltage to an output terminal of the second gamma amplifier.

The power driver may be configured to form electrical conduction paths through first through fourth interconnections in the standby mode.

According to another aspect of embodiments according to the present invention, a source driver is configured to receive a gamma voltage for gray level data, to generate a source voltage, and to apply the source voltage to a pixel circuit of a display panel. The source driver is configured to directly apply the gamma voltage for the gray level data to the pixel circuit of the display panel when the display panel is in a standby mode.

The gamma voltage for the gray level data may include a gamma voltage corresponding to a smallest gray level data and a gamma voltage corresponding to a largest gray level data.

The source driver may include a plurality of channel amplifiers configured to generate a source voltage using the gamma voltage. The source driver may be configured to turn off the channel amplifiers when the display panel is in the standby mode.

According to another aspect of embodiments according to the present invention, a display apparatus includes: a display panel including a plurality of pixel circuits; a power driver including a plurality of boosters and a plurality of amplifiers and configured to apply a voltage for driving the display panel; and a source driver configured to receive a voltage from the power driver and apply a source voltage to the pixel circuits. The power driver is configured to turn off the plurality of amplifiers in a standby mode.

The plurality of boosters may include a first booster, a second booster, and a third booster. The plurality of amplifiers may include a first amplifier, a second amplifier, and a third amplifier coupled to output terminals of the first through third boosters, respectively, and a plurality of gamma voltage amplifiers.

The power driver may be configured to supply an output voltage of the first booster as a gamma voltage corresponding to a smallest gray level data and an input voltage as a gamma voltage corresponding to a largest gray level data.

The power driver may be configured to supply output voltages of the second and third boosters directly to the display panel.

The source driver may include a plurality of channel amplifiers configured to receive a gamma voltage for gray level data from the power driver and to generate a source voltage. The source driver may be configured to turn off the plurality of channel amplifiers in the standby mode.

The power driver may be configured to generate a gamma voltage corresponding to a smallest gray level data and a gamma voltage corresponding to a largest gray level data as the gamma voltages for the gray level data in the standby mode. The source driver may be configured to apply the gamma voltage corresponding to the smallest gray level data and the gamma voltage for the largest gray level data to the pixel circuits.

The display panel may be an organic light emitting diode display device.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
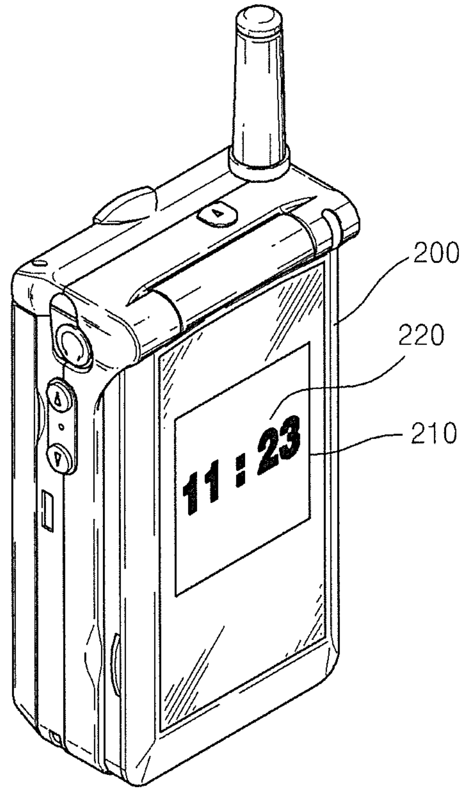
FIG. 1 (PRIOR ART)
FIG. 1 is a diagram of a portable phone having a display screen installed on an outward facing side on which a clock is displayed.
Figure 2:
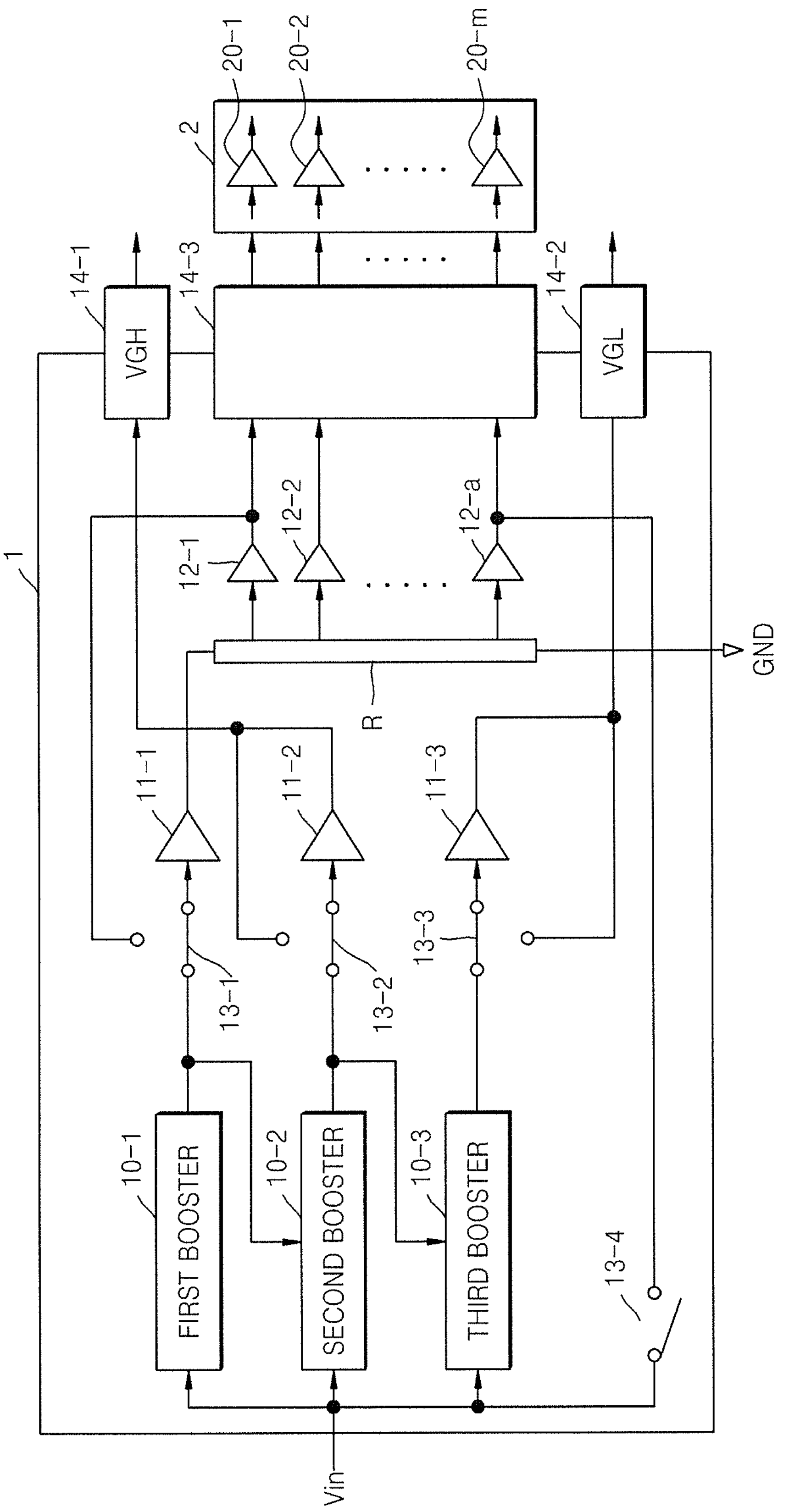
FIG. 2 is a circuit diagram illustrating normal display mode operations of a power driver and a source driver according to an exemplary embodiment of the present invention.

FIG. 2 is a diagram of a power driver and a source driver in a normal display mode according to an exemplary embodiment of the present invention.

In the embodiment shown in FIG. 2, a power driver 1 generates a voltage for driving a display apparatus and applies the voltage to each unit. The power driver 1 includes a plurality of boosters 10-1 to 10-3, a plurality of amplifiers 11-1 to 11-3, a plurality of switching units 13-1 to 13-3, a resistor ladder (or resistance string) R, and a plurality of gamma amplifiers 12-1 to **12-*a*. Also, the power driver 1 includes output terminals 14-1 to 14-3 configured to output a voltage to a display panel and a source driver 2**.

In a normal display mode according to one embodiment of the present invention, a first booster 10-1, a second booster 10-2, and a third booster 10-3 convert an externally applied input voltage Vin into set voltages, that is, first through third voltages, respectively. For example, when a voltage of about 2.8V is applied from an external battery, the first booster 10-1 may amplify the input voltage Vin to twice its voltage and may output a voltage of about 5.6V. The second booster 10-2 may output a voltage of 8.4V, which is three times as high as the input voltage Vin, using the input voltage Vin and the output voltage of the first booster 10-1. Boost converters, which generate output voltages higher than input voltages, may be used as the first and second boosters 10-1 and 10-2. Also, the third booster 10-3 may output a negative voltage, for example, a voltage of −8.4V, using the input voltage Vin and the output voltage of the second booster 10-2. A buck converter may be used as the third booster 10-3.

In the embodiment of FIG. 2, the first amplifier 11-1 is connected to an output terminal of the first booster 10-1 and receives a first voltage output by the first booster 10-1. The first amplifier 11-1 generates a gamma reference voltage using an applied voltage. The generated gamma reference voltage is applied to the resistor ladder R.

The second amplifier 11-2 of the embodiment shown in FIG. 2 is connected to an output terminal of the second booster 10-2 and receives a second voltage output by the second booster 10-2. The second amplifier 11-2 may generate a first panel voltage VGH, which may be applied to the display panel, using an applied voltage. For example, a voltage of 5V may be generated as the first panel voltage VGH. The first panel voltage VGH generated by the second amplifier 11-2 may be applied to the first output terminal 14-1 and externally output.

The third amplifier 11-3 of the embodiment shown in FIG. 2 is connected to an output terminal of the third booster 10-3 and receives the third voltage output by the third booster 10-3. The third amplifier 11-3 may generate a second panel voltage VGL, which may be applied to the display panel, using the applied voltage. For example, a voltage of −7V may be generated as the second panel voltage VGL. The second panel voltage VGL generated by the third amplifier 11-3 may be applied to the second output terminal 14-2 and externally output.

The resistor ladder R of the embodiment of FIG. 2 has one terminal to which the output voltage (i.e., the first voltage) of the first amplifier 11-1 is applied and the other terminal to which a ground voltage GND is applied. The resistor ladder R may use the output voltage of the first amplifier 11-1, for example, a voltage of 5.6V, as a gamma reference voltage. The resistor ladder R outputs a plurality of voltages corresponding to a range of gray level data (or a predetermined range of gray level data or a predetermined grayscale level number) using the gamma reference voltage. For example, the resistor ladder R may output a voltage of 4.2V as a voltage corresponding to a smallest (or minimum) gray level data (or grayscale level) and may output a voltage of 0V as a voltage corresponding to a largest (or maximum) gray level data (or grayscale level). Also, the resistor ladder R may output a plurality of voltages having intermediate values between 4.2V and 0V.

The voltages output by the resistor ladder R of the embodiment of FIG. 2 corresponding to gray level data are applied to the gamma amplifiers 12-1 to **12-*a*, respectively. The respective gamma amplifiers 12-1 to 12-*a* output gamma voltages corresponding to the gray levels data using the applied voltages. The output gamma voltages are applied through the gamma voltage output terminal 14-3 to the source driver 2**.

Meanwhile, the source driver 2 of the embodiment of FIG. 2 includes a plurality of channel amplifiers 20-1 to **20-*m*. The number of channel amplifiers 20-1 to 20-*m* may depend on the number of pixels arranged in a row direction of the display panel. The source driver 2 receives the gamma voltages generated by the gamma amplifiers 12-1 to 12-*a*. Each of the channel amplifiers 20-1 to 20-*m*** may generate a source voltage using a gamma voltage corresponding to image data out of the received gamma voltages and output the source voltage to a pixel circuit.

In the embodiment described above, in the normal display mode, all the amplifiers included in the power driver 1 and the source driver 2 are operated in order to display an image on the display panel. Specifically, in the normal display mode, the first through third amplifiers 11-1 to 11-3, the first through a-th gamma amplifiers 12-1 to 12-*a*, and the first through m-th channel amplifiers 20-1 to 20-*m* may all be operated.

Figure 3:
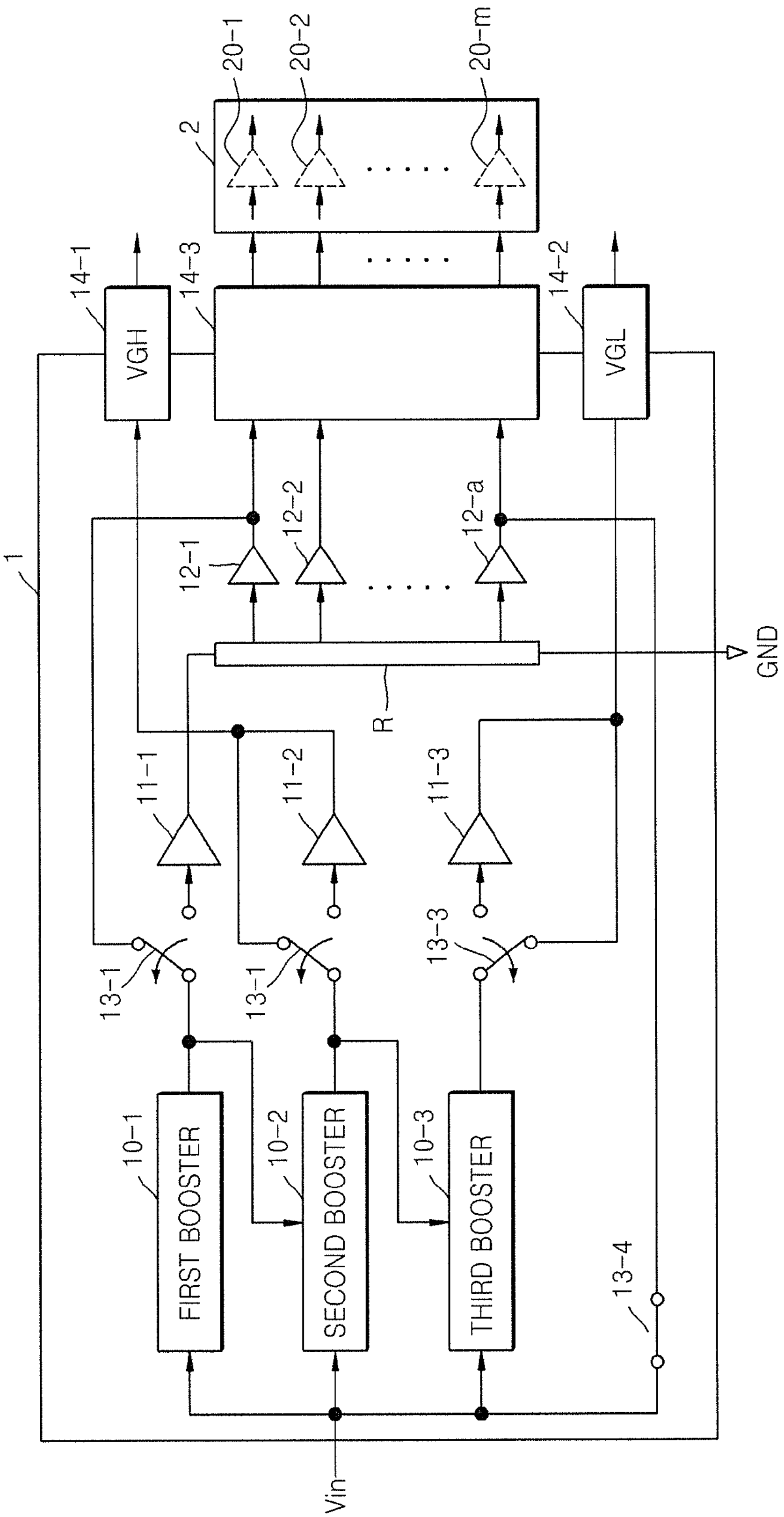
FIG. 3 is a circuit diagram illustrating standby mode operations of a power driver and a source driver according to an exemplary embodiment of the present invention.

FIG. 3 is a diagram illustrating a power driver and a source driver in a standby mode according to an exemplary embodiment of the present invention.

In a standby mode according to an embodiment of the present invention, a first booster 10-1, a second booster 10-2, and a third booster 10-3 operate in the same manner as in a normal display mode and convert an externally applied input voltage Vin into first through third voltages, which are set voltages, respectively.

In the standby mode according to an embodiment of the present invention, a first amplifier 11-1, a second amplifier 11-2, and a third amplifier 11-3 are turned off and stop operating. That is, output voltages of the first through third boosters 10-1 to 10-3 are not applied to the first through third amplifiers 11-1 to 11-3, respectively. Thus, the first through third amplifiers 11-1 to 11-3 do not generate a gamma reference voltage, a first panel voltage VGH, and a second panel voltage VGL, respectively.

Meanwhile, according to an embodiment of the present invention, various gray levels (or voltages corresponding to gray levels or grayscale level expressions) are not be used in the standby mode. For example, when a clock is displayed on a display screen, only a voltage corresponding to a largest gray level data (or grayscale level) is used to display image data in a number portion, while a voltage corresponding to a smallest gray level data (or grayscale level) is used to display image data in the remaining portion. In other words, only a gamma voltage corresponding to the largest gray level data and a gamma voltage corresponding to the smallest gray level data are used in the standby mode.

Thus, in the standby mode according to an embodiment of the present invention, an output terminal of the first booster 10-1 is connected to an output terminal of a first gamma amplifier 12-1. Also, an input terminal through which the external input voltage Vin is applied is directly connected to an output terminal of an a-th gamma amplifier 12-*a* (which may be referred to as a "second gamma amplifier"). That is, a first voltage output by the first booster 10-1 is used as a gamma voltage corresponding to the smallest gray level data, while the external input voltage Vin is used as a gamma voltage corresponding to the largest gray level data.

Also, an output terminal of the second booster 10-2 is directly connected to a first output terminal 14-1, and an output terminal of the third booster 10-3 is connected to a second output terminal 14-2. That is, a second voltage output by the second booster 10-2 is used as a first panel voltage VGH, and a third voltage output by the third booster 10-3 is used as a second panel voltage VGL.

In the embodiments of FIGS. 2 and 3, first through fourth interconnections are further formed so that the first voltage and the input voltage Vin may be directly applied to the first gamma amplifier 12-1 and the a-th gamma amplifier 12-*a* (which may be referred to as a "second gamma amplifier") and the second and third voltages may be applied to the first and second output terminals 14-1 and 14-2, respectively. Also, first through fourth switches 13-1 to 13-4 are further formed so that an electrical conduction path may be formed among the first through fourth interconnections in the standby mode.

That is, in the normal display mode of the embodiments of FIGS. 2 and 3, the first switch 13-1 connects the first booster 10-1 and the first amplifier 11-1, the second switch 13-2 connects the second booster 10-2 and the second amplifier 11-2, and the third switch 13-3 connects the third booster 10-3 and the third amplifier 11-3. Also, the fourth switch 13-4 opens the fourth interconnection in order to prevent application of the input voltage Vin to the output terminal of the a-th gamma amplifier 12-*a*.

By comparison, in the standby mode, the first switch 13-1 connects the first booster 10-1 and the first interconnection, the second switch 13-2 connects the second booster 10-2 and the second interconnection, and the third switch 13-3 connects the third booster 10-3 and the third interconnection. Also, the fourth switch 13-4 connects (or short-circuits) the fourth interconnection so that the input voltage Vin is applied to the output terminal of the a-th gamma amplifier 12-*a*.

The first through fourth interconnections and the first through fourth switches 13-1 to 13-4 as shown in FIG. 2 depicts one embodiment. However, the present invention is not limited to the specific interconnections shown therein. That is, as long as the first voltage and the input voltage Vin are directly applied to the first gamma amplifier 12-1 and the a-th (or second) gamma amplifier 12-*a*, respectively, and the second and third voltages are applied to the first and second output terminals 14-1 and 14-2, respectively, while turning off the amplifiers 11-1 to 11-3 and 12-1 to 12-*a* of the power driver 1, it is capable of various changes and modifications.

In one embodiment of the present invention, in the standby mode, a gamma voltage output terminal 14-3 outputs only a gamma voltage corresponding to a smallest gray level data and a gamma voltage corresponding to a largest gray level data to the source driver 2.

In the standby mode, the source driver 2 outputs only the gamma voltage corresponding to the smallest gray level data and the gamma voltage corresponding to the largest gray level data to each of channels and turns off all channel amplifiers 20-1 to 20-*m*.

As described above, when displaying an image on a display panel in the standby mode, all the amplifiers included in the power driver 1 and the source driver 2 may be turned off. On the other hand, in the normal display mode, all the first through third amplifiers 11-1 to 11-3, all the first through a-th gamma amplifiers 12-1 to 12-*a*, and all the first through m-th channel amplifiers 20-1 to 20-*m* may be turned on.

An operational amplifier, which is typically used as an amplifier, typically consumes power when turned on. Thus, in the standby mode that requires few gray levels (or no various grayscale level expressions), the various amplifiers (e.g., all the various amplifiers) included in the power driver 1 and the source driver 2 may be turned off, thereby reducing power consumption.

Figure 4:
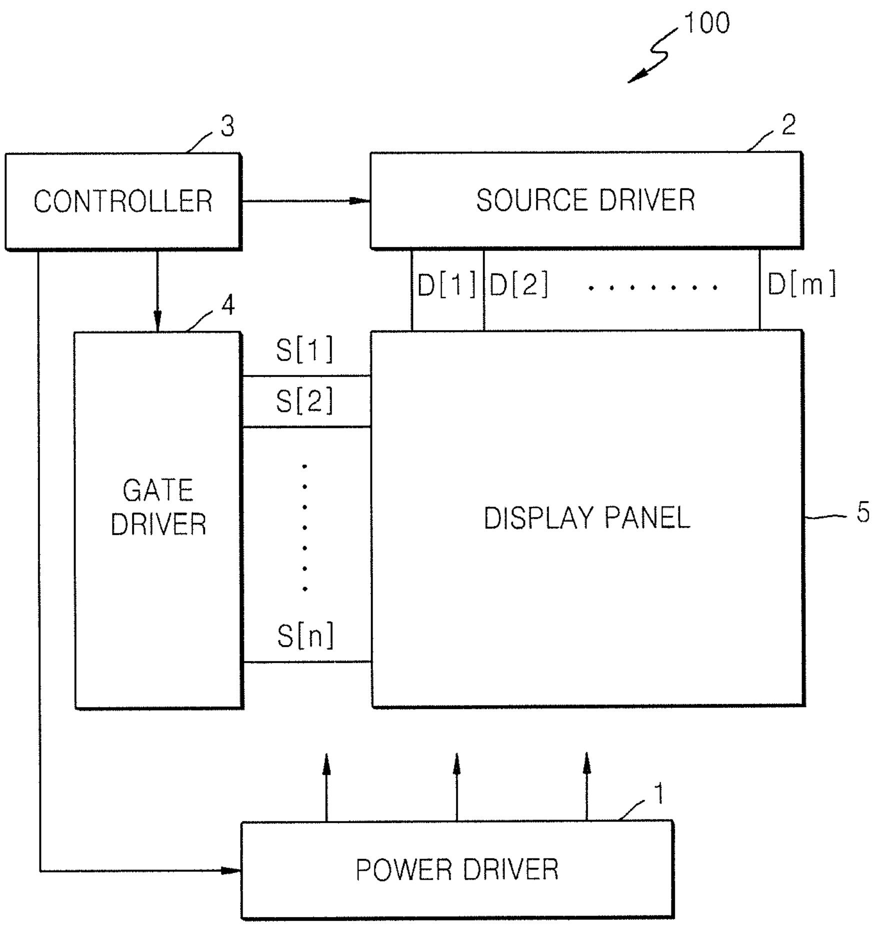
FIG. 4 is a diagram of a display apparatus according to an exemplary embodiment of the present invention.

FIG. 4 is a diagram of a display apparatus 100 according to an exemplary embodiment of the present invention.

Referring to FIG. 4, the display apparatus 100 includes a power driver 1, a source driver 2, a controller 3, a gate driver 4, and a display panel 5.

In the embodiment of FIG. 4, the power driver 1, which may be the power driver 1 described with reference to FIGS. 2 and 3, supplies power for operation of the display apparatus 100 to each unit. Specifically, the power driver 1 applies a first panel voltage VGH and a second panel voltage VGL, for driving the display panel 5, to the display panel 5. Also, the power driver 1 applies a gamma voltage (e.g., a plurality of gamma voltages) to the source driver 2.

The source driver 2 applies data signals to a plurality of data lines D[1] to D[m]. The data lines D[1] to D[m] are respectively connected to output terminals of channel amplifiers 20-1 to 20-*m* of the source driver 2. Here, the data signals are source voltages generated by the channel amplifiers 20-1 to 20-*m*. In a normal display mode, the source voltages are generated using gamma voltages for gray levels corresponding to image data. Also, in a standby mode, the source voltage may be one of a gamma voltage corresponding to a smallest gray level data and a gamma voltage corresponding to a largest gray level data.

The gate driver 4 of the embodiment shown in FIG. 4 applies a scan signal to a plurality of scan lines S[1] to S[n]. The scan signal is sequentially transmitted to the scan lines S[1] to S[n], and a data signal is transmitted to a pixel circuit in response to the scan signal.

The display panel 5 of FIG. 4 includes n×m pixel circuits, n scan lines S[1] to S[n] arranged in a row direction, and m data lines D[1] to D[m] arranged in a column direction. The scan lines S[1] to S[n] transmit scan signals to the pixel circuits. Also, the data lines D[1] to D[m] transmit data signals to the pixel circuits. The display panel 5 may be an organic light emitting diode (OLED) display device, but the present invention is not limited thereto.

The controller 3 of FIG. 4 controls operations of respective units of the display apparatus 100. The controller 3 may determine, for example, whether or not the display apparatus 100 is in the normal display mode or the standby mode and control the power driver 1 and the source driver 2 based on a determination result to turn off the amplifiers included in the power driver 1 and the source driver 2.

The display apparatus 100 having the above-described construction may turn off all the amplifiers in the standby mode, thereby reducing power consumption.

According to the above embodiments of the present invention, power consumption of drivers used for a display apparatus may be reduced in a standby mode.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A power driver comprising a plurality of boosters and a plurality of amplifiers, the power driver being configured to apply a voltage for driving a display apparatus, wherein the plurality of boosters comprises a first booster, a second booster receiving a voltage output by the first booster, and a third booster receiving a voltage output by the second booster, wherein the plurality of amplifiers comprises:

a first amplifier, a second amplifier, and a third amplifier coupled to output terminals of the first through third boosters, respectively; and a plurality of gamma amplifiers, wherein the plurality of boosters are configured to receive an input voltage and convert the input voltage to different voltages respectively, and the plurality of amplifiers are configured to receive one of the converted voltages from corresponding boosters and generate gamma reference voltages for gamma voltages corresponding to gray level data and panel voltages, when the display apparatus is in a normal display mode, and wherein the power driver is configured to turn off the plurality of amplifiers, and output gamma voltages corresponding to a smallest gray level data and a largest gray level data and panel voltages without using the plurality of amplifiers, when the display apparatus is in a standby mode.

2. The power driver of claim 1, wherein the power driver is configured to supply an output voltage of the first booster as a gamma voltage corresponding to the smallest gray level data in the standby mode.

3. The power driver of claim 1, wherein the power driver is configured to supply the input voltage as a gamma voltage corresponding to the largest gray level data in the standby mode.

4. The power driver of claim 1, wherein the power driver is configured to supply output voltages of the second and third boosters directly to a display panel as the panel voltages in the standby mode.

5. A power driver comprising:

a first booster configured to receive an input voltage and generate a first voltage;

a first amplifier configured to generate a reference voltage using the first voltage;

a second booster configured to receive the input voltage and the first voltage and to generate a second voltage;

a second amplifier configured to generate a first panel voltage using the second voltage;

a third booster configured to receive the input voltage and the second voltage and to generate a third voltage;

a third amplifier configured to generate a second panel voltage using the third voltage;

a resistor ladder having a first terminal coupled to the reference voltage and a second terminal coupled to a ground voltage and configured to divide a voltage between the first and second terminals; and a first gamma amplifier and a second gamma amplifier coupled to the resistor ladder and configured to generate gamma voltages, wherein the first through third amplifiers and the first and second gamma amplifiers are configured to be turned off in a standby mode.

6. The power driver of claim 5, wherein the power driver is configured to supply the first voltage as a gamma voltage corresponding to a smallest gray level data and the input voltage as a gamma voltage corresponding to a largest gray level data in the standby mode.

7. The power driver of claim 5, wherein the power driver is configured to supply the second voltage as the first panel voltage and the third voltage as the second panel voltage in the standby mode.

8. The power driver of claim 5, further comprising:

a first interconnection configured to apply the first voltage to an output terminal of the first gamma amplifier;

a second interconnection configured to apply the second voltage to an output terminal of the second amplifier;

a third interconnection configured to apply the third voltage to an output terminal of the third amplifier; and a fourth interconnection configured to apply the input voltage to an output terminal of the second gamma amplifier.

9. The power driver of claim 8, wherein the power driver is configured to form electrical conduction paths through the first through fourth interconnections in the standby mode.

10. A display apparatus comprising:

a display panel comprising a plurality of pixel circuits;

a power driver comprising a plurality of boosters and a plurality of amplifiers and configured to generate gamma voltages corresponding to gray level data and panel voltages for driving the display panel by selectively turning on or off the plurality of amplifiers according to a display mode; and a source driver comprising a plurality of channel amplifiers and configured to receive the gamma voltages from the power driver and to generate source voltages, wherein the plurality of boosters are configured to receive an input voltage and convert the input voltage to different voltages respectively, and the plurality of boosters comprises a first booster, a second booster receiving a voltage output by the first booster, and a third booster receiving a voltage output by the second booster, wherein the plurality of amplifiers comprises a first amplifier, a second amplifier, and a third amplifier coupled to output terminals of the first through third boosters, respectively, and a plurality of gamma voltage amplifiers, wherein the power driver is configured to turn on the plurality of amplifiers, and the plurality of amplifiers receive one of the converted voltages from corresponding boosters and generate gamma reference voltages for the gamma voltages and the panel voltages, in the normal display mode, wherein the power driver is configured to turn off the plurality of amplifiers and generate parts of the gamma voltages and the panel voltages without using the plurality of amplifiers, in a standby mode, and wherein the source driver is configured to turn off the plurality of channel amplifiers, in the standby mode.

11. The apparatus of claim 10, wherein the power driver is configured to supply an output voltage of the first booster as a gamma voltage corresponding to a smallest gray level data, and an input voltage as a gamma voltage corresponding to a largest gray level data in a standby mode.

12. The apparatus of claim 10, wherein the power driver is configured to supply output voltages of the second and third boosters directly to the display panel as the panel voltages in the standby mode.

13. The apparatus of claim 10, wherein the power driver is configured to generate a gamma voltage corresponding to a smallest gray level data and a gamma voltage corresponding to a largest gray level data as the gamma voltage for the gray level data in the standby mode, and wherein the source driver is configured to apply the gamma voltage corresponding to the smallest gray level data and the gamma voltage for the largest gray level data to the pixel circuits.

14. The apparatus of claim 10, wherein the display panel is an organic light emitting diode display device.

* * * * *